United States Patent

Futschik et al.

Patent Number: 6,012,354
Date of Patent: Jan. 11, 2000

[54] STEERING WHEEL FOR A MOTOR VEHICLE

[75] Inventors: Hans-Dieter Futschik, Gechingen; Norbert Weber, Bondorf, both of Germany

[73] Assignee: Daimlerchrsyler AG, Germany

[21] Appl. No.: 09/066,582

[22] Filed: Apr. 27, 1998

[30] Foreign Application Priority Data

Apr. 25, 1997 [DE] Germany .......................... 197 17 412

[51] Int. Cl.⁷ ............................... B62D 1/06; B62D 1/04
[52] U.S. Cl. ............................. 74/558; 74/552; D12/176
[58] Field of Search .................... 74/552, 558; D12/176; 29/894.1

[56] References Cited

U.S. PATENT DOCUMENTS

| | | | |
|---|---|---|---|
| 848,140 | 3/1907 | Towne | 74/552 |
| 2,623,405 | 12/1952 | Sampson | 74/552 |
| 2,705,816 | 4/1955 | Sampson | 74/552 X |
| 2,892,359 | 6/1959 | Overman | 74/552 X |
| 3,331,260 | 7/1967 | Zeller | 74/552 |

FOREIGN PATENT DOCUMENTS

| | | |
|---|---|---|
| 1 912 534 | 3/1974 | Germany . |
| 30 35 074 A1 | 4/1981 | Germany . |
| 84 09 336 | 3/1984 | Germany . |
| 42 38 893 A1 | 5/1994 | Germany . |
| 40 39 138 C2 | 2/1995 | Germany . |
| 195 28 788 C1 | 8/1996 | Germany . |
| 49-76234 | 7/1974 | Japan . |

*Primary Examiner*—Allan D. Herrmann
*Attorney, Agent, or Firm*—Evenson McKeown Edwards & Lenahan P.L.L.C.

[57] ABSTRACT

A steering wheel for a motor vehicle has a steering wheel rim which is closed on all sides and which is connected with a central steering wheel hub by way of radially projecting spokes. The steering wheel rim includes sections which are connected with one another in the cross-section, one forming a decorative section which has a different material at least on the exterior side. In the gripping area of the steering wheel rim which is predominantly gripped by the hands in the driving operation, the decorative section is reduced in its grippable width by the pulled-around other rim section.

4 Claims, 1 Drawing Sheet

STEERING WHEEL FOR A MOTOR VEHICLE

BACKGROUND AND SUMMARY OF THE INVENTION

This application claims the priority of German application 197 17 412.4, filed Apr. 25, 1997, the disclosure of which is expressly incorporated by reference herein.

The present invention relates to a steering wheel for a motor vehicle, and more particularly, to a steering wheel having a steering wheel rim which is closed on all sides and which is connected with a central steering wheel hub by way of radially projecting spokes. The steering wheel rim comprises sections which are connected with one another in the cross-section, one section forming a decorative section which has a different material at least on the exterior side.

DE 30 35 074 A1 shows such a steering wheel for a motor vehicle. The revolving steering wheel rim therein is divided in its cross-section into two sections, for decorative purposes, one section being manufactured of a "nobler" material. A decorating ring of this type, which revolves as part of the steering wheel rim, is normally manufactured of a material which differs from the steering wheel material in order to provide a more individual design for the steering wheel. In this particular example, a decorating ring made of wood has a particularly special or precious effect but has the disadvantage that, when gripped, it clearly feels colder or warmer than the adjoining plastic material of the steering wheel or the material of the steering wheel covered with leather.

Numerous other possibilities exist for designing a steering wheel rim in order to provide the steering wheel rim with a special appearance with a material which differs from the conventional plastic steering wheel. No suggestions are made, however, for the main gripping area of the steering wheel, Thus, the steering wheel shown in DE 84 09 338 U1 has an interior steering wheel rim which is made of metal and is surrounded by a thick wood casing. In its cross-section, the wood casing has several segments glued together and is sealed on the surface by a lacquer layer.

DE 40 39 138 C2 describes a process for manufacturing a steering wheel in which the interior supporting ring is surrounded by plastic foam, after which the plastic foam is removed again in partial sections. A hard plastic material is entered into these partial sections and is covered by a wood veneer.

DE 1 912 534 C1 describes a steering wheel rim having a metallic core ring and a casing of an elastic material which is surrounded by a leather coating. Additional special casings which differ from the conventional plastic steering wheel rim are also described in DE 195 28 788 C1 and DE 42 38 893 A1.

An object of the present invention is to provide a steering wheel which, when gripped, feels comfortable to the motor vehicle driver.

This object has been achieved by providing that the decorative section is reduced, by means of the pulled-around other rim section, in its grippable width in the gripping area of the steering wheel rim which, during the driving operation, is predominantly gripped by the hands.

A steering wheel whose steering wheel rim, which is closed on all sides, has a decorative ring, can be manufactured at reasonable cost because the steering wheel rim cross-section is divided and includes a decorative section and a rim section connected with one another. At least on its grippable surface, the decorative section has a material which differs from the rim section and which is formed, for example, by a veneer of wood.

The decorative section material, which looks more "precious" or elegant in appearance, however, has the disadvantage that, depending on the season and the temperature of the vehicle interior, it feels colder or warmer than the material of the rim section which can be made of plastic or may be covered by leather. In order to make the gripping area of the steering wheel rim, which, in the driving operation, is predominantly surrounded by the driver's hands, more comfortable to grip for the motor vehicle driver, the rim section is pulled farther around in this area and is enlarged, and the decorative section is thereby reduced in its tangible width.

If the decorative section forms the surface of the steering wheel rim which points to the steering wheel hub, the decorative section may be reduced to a width which is visible in the driver's direction so that there is nevertheless a uniform decorating ring in the driver's view. When the decorative section is fixed to the rim section, a covering of the rim section, for example, by glued-on leather, can additionally also be fixed by clamping in a leather edge which protrudes at the edge of the rim section.

BRIEF DESCRIPTION OF THE DRAWINGS

Other objects, advantages and novel features of the present invention will become apparent from the following detailed description of the invention when considered in conjunction with the accompanying drawings wherein.

DETAILED DESCRIPTION OF THE DRAWINGS

Figure 1:
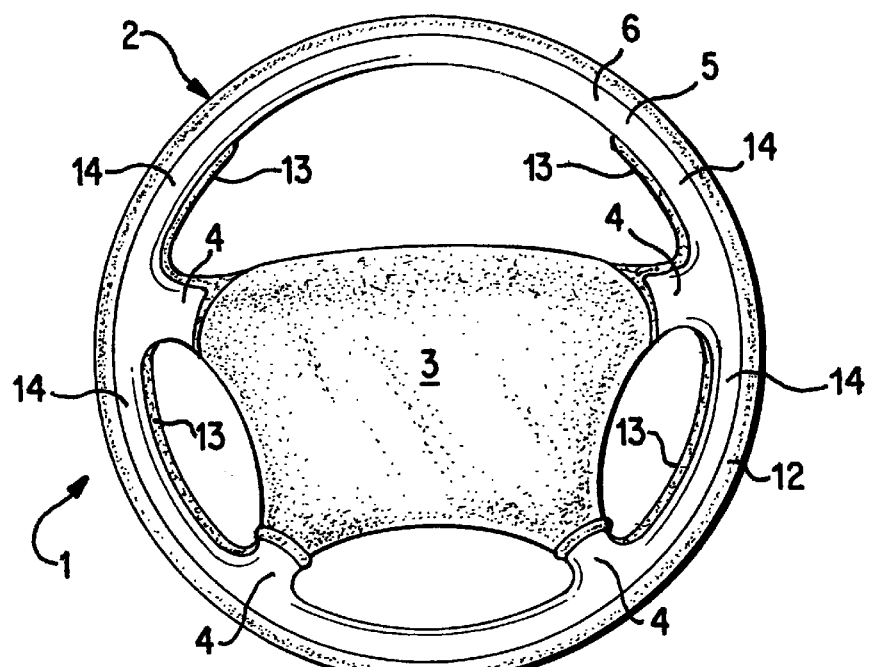
FIG. 1 is a front view of a steering wheel viewed from the driver's direction.

In FIG. 1, a conventional steering wheel 1 in a motor vehicle has a steering wheel rim 2 which is closed on all sides and which is connected by way of radially projecting spokes 4 with a central steering wheel hub 3. For refinement purposes, the steering wheel rim 2 has an inserted ring 5 whose visible surface is formed by a wood veneer.

Figure 2:
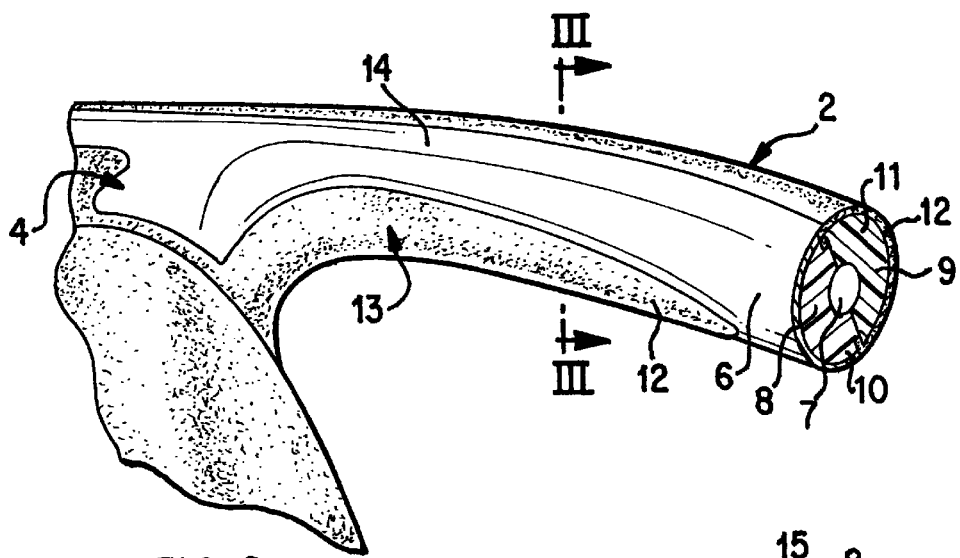
FIG. 2 is a partial persepctive view of an enlarged portion of the steering wheel rim in the gripping area next to a steering wheel spoke in the steering wheel of FIG. 1.

FIG. 2 illustrates the steering wheel rim 2 which, in cross-section, is formed around a round steel cross-section 7 situated in the center. The run 2 includes a decorative section 8 forming the ring 5 and a rim section 9 connected with the spokes 4, which are fastened to one another by, for example, gluing or snapping. The decorative section 8 has a plastic core 10 which takes up about half the cross-section and has a wood veneer 6 on the grippable surface. The rim section 9 has a plastic core 11 which forms the other half of the cross-section and has a leather covering 12.

Figure 3:
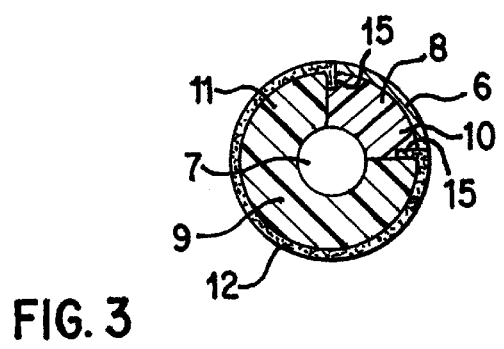
FIG. 3 is a sectional view along line III—III in FIG. 2.

So that, even at particularly hot or cold temperatures, the driver can have a comfortable feeling when gripping around this steering wheel rim 2, in the gripping area 13 of the steering wheel rim 2 which is predominantly gripped by the hands in the driving operation, the rim section 9 is pulled farther around in this area or its cross-section has a larger construction, and the decorative section 8 is thereby reduced in its grippable width 14, as illustrated in detail in FIG. 3. Thereby, the decorative section 8 will still be visible in the driver's direction.

The glued-on leather covering 12 of the rim section 9 can additionally also be fixed by the clamping-in of a leather edge 15 projecting at the edge of the rim section 9 during the fastening of the decorative section on the rim section 9.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Steering wheel for a motor vehicle, comprising a steering wheel rim configured to be closed on all sides thereof and operatively connected with a central steering wheel hub via radially projecting spokes, wherein the steering wheel rim includes sections, in which one section forms a decorative section having a different material at least on the exterior side thereof and is reduced, by a pulled-around other rim section, in a grippable width in a gripping area of the steering wheel rim which, during the driving operation, is predominantly hand gripped.

2. The steering wheel according to claim 1, wherein the decorative section forms approximately a surface of the steering wheel rim which points to the steering wheel hub, and, in the gripping area, is reduced to the grippable width which is visible in a driver's viewing direction.

3. The steering wheel according to claim 1, wherein the decorative section is covered by a wood veneer.

4. The steering wheel according to claim 1, wherein a leather covering of the rim section is associated together with the decorative section.

* * * * *